United States Patent [19]
Ariki

[11] Patent Number: 5,162,637
[45] Date of Patent: Nov. 10, 1992

[54] ODOMETER APPARATUS

[75] Inventor: Yoshiyuki Ariki, Kumagaya, Japan

[73] Assignee: Jeco Company Limited, Saitama, Japan

[21] Appl. No.: 712,337

[22] Filed: Jun. 7, 1991

[30] Foreign Application Priority Data

Jun. 12, 1990 [JP] Japan .................. 2-61985[U]
Nov. 28, 1990 [JP] Japan .................. 2-125520[U]

[51] Int. Cl.$^5$ .......................................... G06C 15/26
[52] U.S. Cl. ............................ 235/133 R; 235/139 R
[58] Field of Search ............ 235/95 R, 133 R, 139 R

[56] References Cited

U.S. PATENT DOCUMENTS 3,494,549 2/1970 Späth ....................... 235/139 R

FOREIGN PATENT DOCUMENTS 10468 5/1979 Japan .
2196 8/1989 Japan .

*Primary Examiner*—L. T. Hix
*Assistant Examiner*—Eddie C. Lee

[57] ABSTRACT

An odometer apparatus having an error elimination mechanism for eliminating an error in an indication figure. The odometer apparatus includes a set of gears rotatably supported on a first shaft for indicating each digit of a set of digits in the indication figure, a set of pinions coupled with the gears and rotatably supported on a second shaft for transmitting a rotation force to the gears, a set of bosses each arranged between two adjacent pinions and formed integrally with the pinions, each of the bosses having a substantially square section taken in a plane perpendicular to the second shaft, and a pressure member for eliminating an error in the indication figure due to a backlash between the gears and the pinions. The pressure member is engaged in a unique manner with a side surface of one of the bosses such that the side surface of the boss is pressed by the pressure member at a predetermined angle to the side surface so as to apply appropriate pressure to the boss on the second shaft to eliminate an indication figure error. Also, the odometer has a reverse rotation prevention mechanism which is formed with a spring member for preventing the gears from being rotated reversely around the first shaft.

8 Claims, 7 Drawing Sheets

ODOMETER APPARATUS

BACKGROUND OF THE INVENTION

The present invention generally relates to an odometer apparatus, and more particularly to an odometer apparatus in which a figure representing travel distance traveled by a motor vehicle is indicated, the figure with a set of digits each being indicated by the amount of rotation of each of several indication gears cooperatively coupled with several pinions.

A prior art odometer apparatus as shown in FIGS. 1 and 2 includes a frame 1, two parallel supporting shafts 2, 3 provided within the frame 1, a plurality of indication gears 41 to 46, a plurality of pinions 5, a worm gear shaft 8, a transmitting gear 9, and a drive gear 10. The worm gear shaft 8 is rotated by a drive motor in accordance with the travel distance traveled by a vehicle, and a rotating force from the worm gear shaft 8 is transmitted to the plurality of pinions 5 via the drive gear 10 and the transmitting gear 9. The indication gears 41 to 46 are rotated around the supporting shaft 2 respectively by the pinions 5 in accordance with the travel distance traveled by the vehicle. Each of several digits in an indication figure representing the travel distance of the vehicle is described by the amount of rotation of each of the indication gears 41 to 46.

As shown in FIGS. 1 and 2, the transmitting gear 9 has two shift teeth 7 formed on one side thereof and each of the indication gears 41 to 46 has a number of connecting teeth 6 formed on one side thereof and two shift teeth 7 formed on the opposite side thereof. And, a plurality of pinions 5 are rotatably supported on the supporting shaft 3, and the teeth 6 and the two shift teeth 7 are engaged with the indication gears 41 to 46 so that the teeth 5b of the pinions 5 are engaged with the two shift teeth 7 of the indication gears 41 to 46 and with the connecting teeth 6 of an indication gear next to one of the other indication gears, so the rotating movement of the pinions 5 is coordinated with that of the indication gears 41 to 46. A number of boss portions 5a are formed along the supporting shaft 3, each of the boss portions 5a being arranged between two adjacent pinions 5 and having a cross section of a generally square shape as shown in FIG. 2.

Also provided in the odometer apparatus are a number of pressure members 11 aligned along the supporting shaft 3. These pressure members 11, which may be, for example, leaf springs, are fixed to the frame 1 at one end thereof and opposed to the boss portions 5a having a generally square cross section at the other end thereof. Since the pressure members 11 operate to keep the pinions 5 at the same rotation phase around the supporting shaft 3 by applying pressure to the boss portions 5a, the prior odometer apparatus can prevent the occurrence of an error in the indication figure due to the backlash between the gears 41 to 46 and the pinions 5. In the case of the prior odometer apparatus, each of the pressure members 11 is parallel to and snugly in contact with a side surface of the boss portion 5a to exert appropriate pressure for eliminating an error in the figure due to the backlash between the gears and the pinions.

However, the pressure members 11 of the prior odometer apparatus are arranged to press completely a side surface of each of the boss portions 5a supported on the supporting shaft 3 to eliminate the indication figure error due to the above described backlash, and the pressure members 11 show a relatively great deflection, thereby requiring a large load torque to operate the odometer apparatus. FIG. 3 is a characteristic chart showing the load torque of the prior art odometer apparatus shown in FIGS. 1 and 2 with respect to the pinion rotation angle. As shown in FIG. 3, the peak load torque or the maximum load torque appears when the pinion is rotated about 10 degrees from the initial position (when the pinion rotation angle is equal to 0 deg), the level of the maximum load torque being approximately twice that of the initial load torque when the pinion is at the initial position. This means that the conventional odometer apparatus requires a drive torque which is twice as large as that of the load torque required for preventing an error in the indication figure from occurring due to the above described backlash. Thus, the prior odometer apparatus has a problem in that a relatively large drive torque must be applied to the odometer apparatus, and it is difficult to construct a compact apparatus because a drive motor being used has to be relatively large in size. In the case of a motor drive type odometer apparatus, because a drive motor for applying drive torque to the odometer apparatus must output a relatively large torque, the odometer apparatus including the drive motor has to be large in size, and the manufacturing cost thereof is thus increased.

In addition, the prior art odometer apparatus usually has a reverse rotation prevention mechanism, which is disclosed, for example, in Japanese Published Patent Application No. 54-10468. In this reverse rotation prevention mechanism, a plurality of indication gears are rotatably supported on a first shaft, and a plurality of pinions are rotatably supported on a second shaft, each of the indication gears being formed into an asymmetrical shape, a number of connecting teeth being formed on one side of each indication gear and two shift teeth formed on the opposite side thereof. Adjacent to the two shift teeth of the indication gears, there are respectively provided a set of stepped surfaces for preventing the reverse rotation of the indication gears. In a normal operation, the indication gears are rotated around the first shaft in the forward direction to indicate an indication figure. When the indication gears are rotated in the reverse direction, the teeth of the pinions 5 strike the stepped surfaces of the indication gears and are connected with the teeth of the pinions 5, thus preventing the indication gears from being rotated in the reverse direction.

However, the prior art odometer apparatus described above has a problem in that the indication gears having the two shift teeth and the stepped surfaces have a complicated shape and the cost of the odometer parts is thus increased. In addition, when the odometer having the reverse rotation prevention mechanism is inspected in an inspection line for checking the quality of finished products, it is difficult to reversely rotate the indication gears, which makes the inspection of the finished products inconvenient.

SUMMARY OF THE INVENTION

It is a general object of the present invention to provide an improved odometer apparatus in which the above described problems of the prior art odometer apparatus are eliminated.

Another and more specific object of the present invention is to provide an odometer apparatus which enables the maximum load torque described above to be reduced to the lowest possible level necessary for eliminating an error in the indication figure due to the backlash between the indication gears and the pinions. The above mentioned object of the present invention can be achieved by an odometer apparatus which comprises a plurality of gears for indicating an indication figure with a set of digits, the plurality of gears being rotatably supported on a first shaft, and the amount of rotation by each of the gears indicating each digit of the set of digits in the indication figure, a plurality of pinions for transmitting a rotation force from a drive shaft to the plurality of gears, the plurality of pinions each being rotatably supported on a second shaft parallel to the first shaft and having a set of teeth cooperatively coupled with each gear of the plurality of gears, a plurality of bosses each arranged between two adjacent pinions of the above pinions and formed integrally with each of the pinions, each of the bosses having a substantially square section taken in a plane perpendicular to the second shaft, and each of the bosses being defined by four sides and four edges, and a pressure member for eliminating an error in the indication figure due to a backlash between the gears and the pinions, the pressure member being arranged such that a side surface of one of the bosses is pressed by the pressure member at a predetermined angle to the side surface of one of the bosses so as to apply appropriate pressure to one of the bosses on the second shaft to eliminate the error in the indication figure. According to the present invention, the side surface of one of the bosses having a substantially square cross section is pressed by the pressure member at a predetermined angle to the side surface so that the maximum deflection of the pressure member when the pinions rotate around the second shaft can be reduced to the lowest possible level necessary for eliminating the indication figure error. Therefore, the maximum load torque applied to the odometer apparatus can be reduced suitably, which allows a smaller drive motor to be used for a motor drive type odometer apparatus and allows such a drive motor in the odometer apparatus to be installed in a smaller space, thus enabling a compact odometer design to be made. Accordingly, the manufacturing cost of the odometer apparatus can be reduced.

Still another object of the present invention is to provide an odometer apparatus which has a reverse rotation prevention mechanism with a relatively simple shape, the reverse rotation prevention mechanism being easily released. The above mentioned object of the present invention can be achieved by an odometer apparatus which comprises a plurality of gears for indicating an indication figure with a set of digits, the plurality of gears being rotatably supported on a first shaft, and the amount of rotation by each of the gears indicating each of the set of digits in the indication figure, a plurality of pinions for transmitting a rotation force to the plurality of gears, the plurality of pinions each being rotatably supported on a second shaft parallel to the first shaft and having a set of teeth cooperatively coupled with each of the gears, and a spring member for exerting pressure on at least one of the pinions in a direction opposite to a normal rotation direction of the pinions around the second shaft, at least one of the gears having a recessed portion formed on an outside peripheral surface thereof, the one of the gears having a set of teeth coupled with the set of teeth of the pinion on which the pressure is exerted by the spring member, and one of the teeth of the pinion striking and connecting with the recessed portion when the gears are rotated in the reverse direction around the first shaft, thus preventing the gears from being rotated in the reverse direction. According to the present invention, one of the pinions is pressed by the spring member in the reverse direction around the second shaft, and one of the gears has a recessed portion formed on the stepped surface thereof, one of the teeth of the pinion striking and connecting with the recessed portion when the gears are rotated in the reverse direction around the first shaft, thereby stopping the reverse rotation of the gears around the first shaft. Therefore, the reverse rotation prevention mechanism of the odometer apparatus can be made so that the gears have a relatively simple shape, and the cost of the odometer parts can be reduced. In addition, the reverse rotation mechanism of the present invention can be released with ease by changing the direction in which the spring member is arranged with respect to the side surface of the bosses.

Other objects and further features of the present invention will become more apparent from the following detailed description when read in conjunction with the accompanying drawings.

DESCRIPTION OF THE PREFERRED EMBODIMENT

Figure 4:
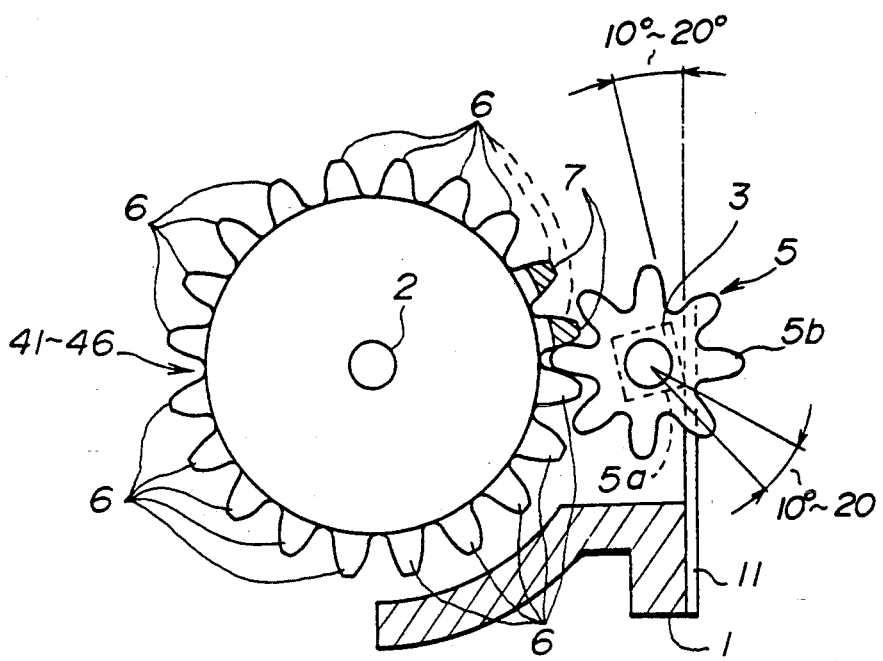
FIG. 4 is an enlarged side view showing an essential part of an embodiment of an odometer apparatus according to the present invention, which corresponds to a side view taken along a line IV—IV in FIG. 1.

First, a description will be given of an embodiment of an odometer apparatus according to the present invention, with reference to FIG. 4. As shown in FIG. 4, the odometer apparatus of the present invention includes a frame 1, a plurality of gears 41 through 46 rotatably supported on a supporting shaft 2, a plurality of pinions 5 rotatably supported on a supporting shaft 3, each of the pinions 5 having a set of alternately wide and narrow teeth 5b, a plurality of bosses 5a arranged between two adjacent pinions among the pinions 5 in the supporting shaft 3, each of the bosses 5a having a cross section taken in a plane perpendicular to the supporting shaft 3, the cross section being of a generally square shape and being defined by four sides and four edges of such a square, and a plurality of pressure members 11 being fixed at one end thereof to the frame 1 and opposed at the other end thereof to the respective bosses 5a.

Figure 1:
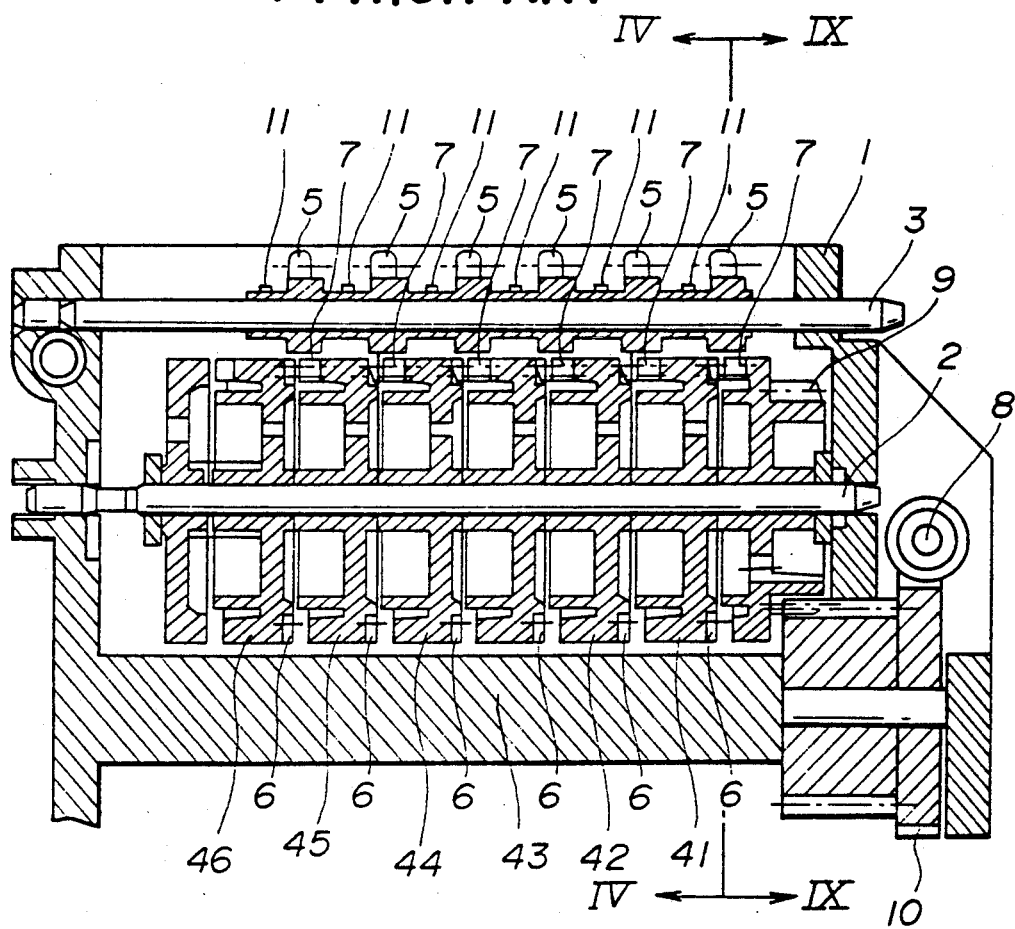
FIG. 1 is a cross-sectional view generally showing a construction of a prior art odometer apparatus.
Figure 2:
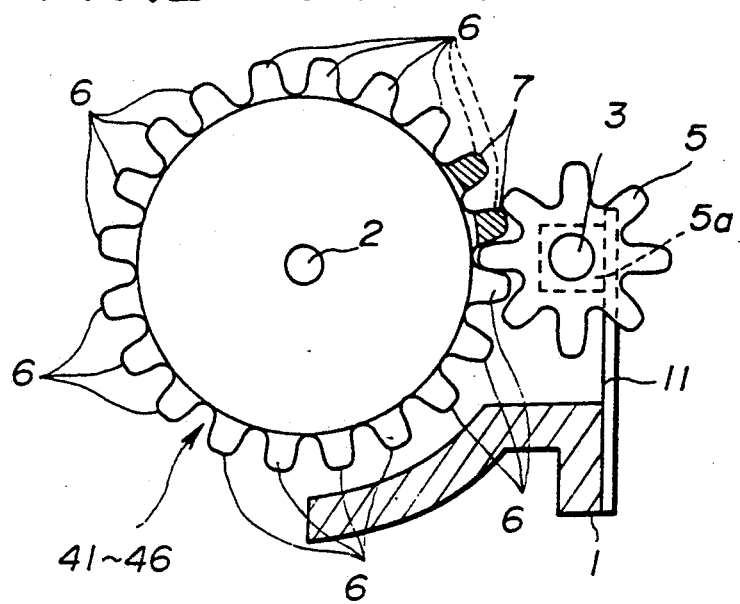
FIG. 2 is an enlarged side view showing an essential part of the prior odometer apparatus shown in FIG. 1.
Figure 3:
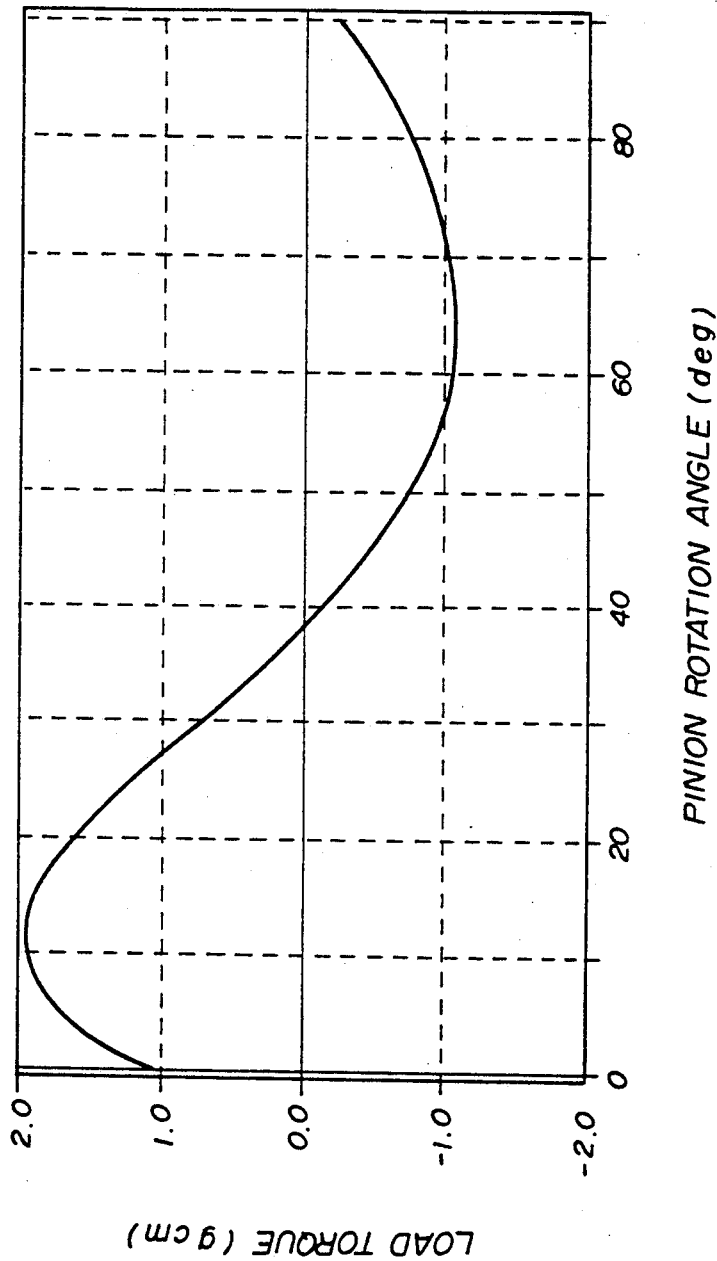
FIG. 3 is a characteristic chart for explaining the operation of the odometer apparatus shown in FIG. 1.

Similar to the apparatus as shown in FIGS. 1 and 2, the odometer apparatus shown in FIG. 4 also includes a worm gear shaft 8, a transmitting gear 9, and a drive gear 10. It should be noted that FIG. 4 is a side view of the odometer apparatus of the present invention, which corresponds to a side view of the prior apparatus taken along a line IV—IV in FIG. 1. Each of the pinions 5 has a set of eight teeth 5b, which are formed into alternate wide and narrow teeth on a peripheral portion of each of the pinions 5. The transmitting gear 9 has two teeth 7 formed on one side thereof for shifting a digit of the indication figure, and only the wide teeth of the set of eight teeth 5b of each pinion 5 are engaged with the two teeth 7 of the transmitting gear 9. A rotation force of the transmitting gear 9 is transmitted to each of the pinions 5 by the engagement of the two teeth 7 of the transmitting gear 9 with the wide teeth 5b of the pinions 5. The narrow teeth of the pinions 5 do not cause the rotation of the transmitting gear 9.

Each of the gears 41 to 46 has a number of connecting teeth 6 formed on one side peripheral portion thereof and two teeth 7 formed on the opposite side peripheral portion thereof, and the connecting teeth 6 of a right-side gear among the gears 41 to 46 and the two teeth 7 of a left-side gear, adjacent to the former gear, are engaged with the teeth 5b of the pinions 5, so that the rotation movement of the transmitting gear 9 is transmitted to the gears 41 to 46 in succession via the pinions 5. As described above, the worm gear shaft 8 is rotated by a drive motor (not shown) in accordance with the distance traveled by the vehicle, and a rotating force from the worm gear shaft 8 is transmitted to the pinions 5 via the drive gear 10 and the transmitting gear 9. The gears 41 to 46 are rotated around the supporting shaft 2 respectively by the pinions 5 in accordance with the distance traveled by the vehicle. Each of six digits of an indication figure representing the distance traveled by the vehicle is indicated by the amount of rotation of each of the six gears 41 to 46.

In the odometer apparatus shown in FIG. 4, the teeth 5b of each of the pinions 5 and the edges of each of the bosses 5a, supported on the supporting shaft 3, are arranged to have a predetermined phase angle between the respective edges and the respective teeth 5b, and this predetermined phase angle is an angle of between 10 deg and 20 deg, as shown in FIG. 4. Therefore, each of the pressure members 11 fixed at one end thereof to the frame 1 is arranged to be in contact with a side surface of each of the bosses 5a at an inclination angle to the side surface, which is equal to the predetermined phase angle, or an angle of between 10 deg and 20 deg, and the side surface of each of the bosses 5a is pressed by each of the pressure members 11 at such a predetermined angle to the side surface described above.

Figure 5:
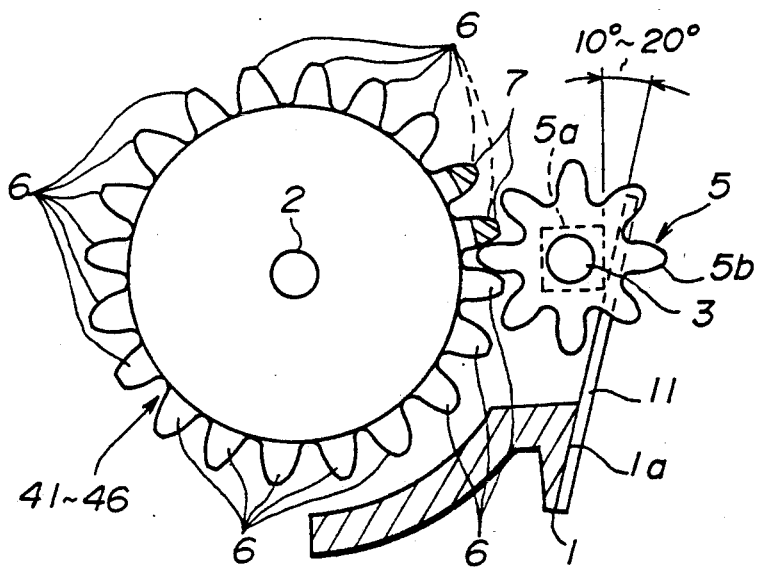
FIG. 5 is an enlarged side view showing a modified example of the essential part of the odometer apparatus shown in FIG. 4.

FIG. 5 shows a first modified example of the odometer apparatus according to the present invention. The odometer apparatus shown in FIG. 5 has a plurality of pressure members 11 which are each mounted at one end thereof on a mounting surface 1a of the frame 1, which is a modification of the mounting surface of the frame 1 of the odometer apparatus shown in FIG. 4. This modified mounting surface 1a of the frame 1 on which the pressure member 11 is mounted at one end thereof is formed slantingly with respect to a side surface of the boss 5a such that the other end of the pressure member 11 is arranged at a predetermined angle to the side surface of the boss 5a, and this predetermined angle is equal to an angle of between 10 deg and 20 deg. Therefore, the side surface of the square section of each of the bosses 5a is pressed by each of the pressure members 11 at the predetermined angle to the side surface to apply appropriate pressure to eliminate an error in the indication figure due to the backlash between the gears 41 to 46 and the pinions 5.

Figure 6:
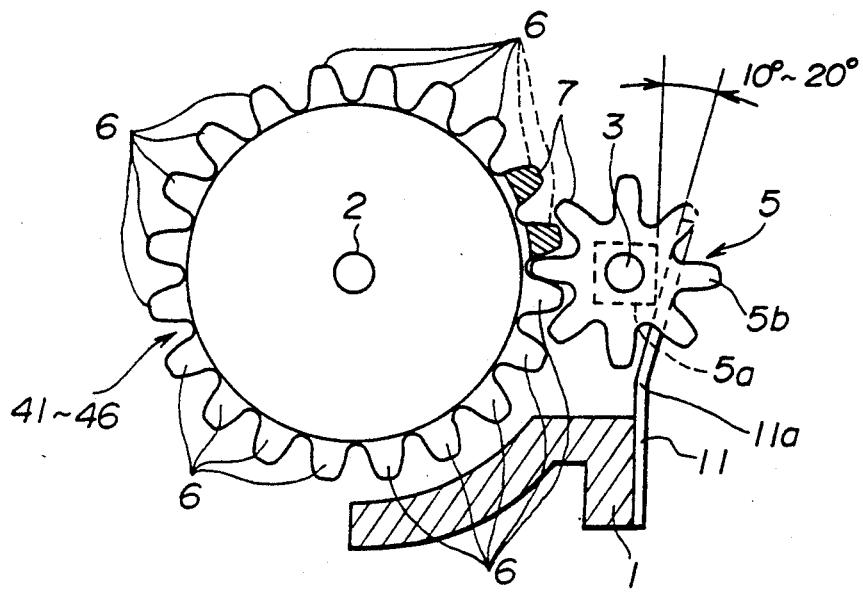
FIG. 6 is an enlarged side view showing another modified example of the essential part of the odometer apparatus shown in FIG. 4.

FIG. 6 shows a second modified example of the odometer apparatus according to the present invention. In the odometer apparatus shown in FIG. 6, each of the pressure members 11 is fixed at one end thereof to the frame 1 and bent at an intermediate portion such that one side surface of each of the bosses 5a is pressed by each of the pressure members 11, respectively, at a predetermined angle to the side surface of the bosses 5a to apply appropriate pressure to the supporting shaft 3 for eliminating the error in the indication figure owing to the backlash between the gears 41 to 46 and the pinions 5. Similar to the first modified example described above, this predetermined angle of the pressure members 11 relative to the side surface of each of the bosses 5a is equal to an angle between 10 deg and 20 deg.

Figure 7:
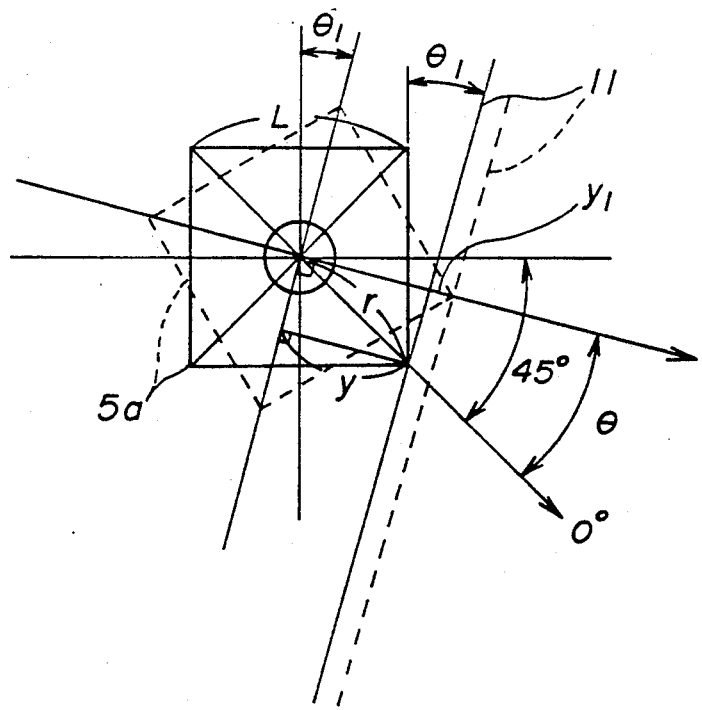
FIG. 7 is a diagram for explaining the deflection of the pressure member in the odometer apparatus shown in FIGS. 4 through 6 when the pinions rotate around the supporting shaft.

As shown in FIGS. 4 to 6, the odometer apparatus is constructed such that one side surface of each of the bosses 5a having a generally square cross section is pressed, respectively, by each of the pressure members 11 at a predetermined angle to the side surface, the predetermined angle being equal to an angle of between 10 deg and 20 deg. FIG. 7 is a schematic diagram showing a cross section of one of the bosses 5a and one of the pressure members 11 for explaining the deflection of each of the pressure members 11 in the odometer apparatus shown in FIGS. 4 through 6 when the pinions 5 rotate around the supporting shaft 3. In FIG. 7, the amount of deflection $\Delta Y1$ of the pressure member 11 when the pinion 5 rotates from an initial position (the initial position of the boss 5a being indicated by a solid line in FIG. 7) around the supporting shaft 3 by a rotation angle $\theta$ which is between 0 deg and 45 deg (the position of the rotated boss 5a being indicated by a dotted line in FIG. 7), is represented by the following formula:

$$\Delta Y1 = r[\cos(45 - \theta1 - \theta) - \cos(45 - \theta1)] \qquad (1)$$

where $\theta$ is the rotation angle of each of the pinions 5 (in degrees), $\theta1$ is the predetermined angle (in degrees) between the pressure member 11 and the side surface of the boss 5a having a substantially square cross section and r is equal to half the length of a diagonal of the square section of the boss 5a taken in a plane perpendicular to the supporting shaft 3. The square cross section of the boss 5a is defined by four sides and four edges of the cross section of the boss 5a.

When the pinion 5 rotates by a rotation angle $\theta$ which is equal to an angle between 45 deg and 90 deg, the amount of deflection $\Delta Y2$ of the pressure member 11 in such a case is represented by the following formula:

$$\Delta Y2 = r[\cos(-45 + \theta1 + \theta) - \cos(45 - \theta1)] \qquad (2)$$

In the case in which the pinion 5 is rotated by a rotation angle $\theta$ between 45 deg and 90 deg, there is a special point where a first vertex of the square of the boss 5a first coming in contact with the surface of the pressure member 11 changes to a second vertex of the square section of the boss 5a during the course of a further rotation of the pinion 5 around the second shaft 3. The second vertex of the square section is adjacent to the first vertex of the square section where the boss 5a first comes in contact with the pressure member 11, and located at a portion in the direction opposite to the rotation of the pinion 5. The amount of deflection $\Delta Y3$ of the pressure member 11 in such a case is represented by the following formula:

$$\Delta Y3 = \Delta Y2 + L \tan(\theta 1 + \theta - 90) \tag{3}$$

where L is equal to the length of one side of the square defined by the cross section of the boss 5a, and $\Delta Y2$ is the amount of deflection of the pressure member 11 represented by the formula (2) above.

The odometer apparatus according to the present invention is constructed such that the pressure members 11 are each arranged at a predetermined angle $\theta 1$ relative to a side surface of the square section of each of the bosses 5a, the predetermined angle $\theta 1$ being set at an angle of between 10 deg and 20 deg. The side surface of the square section of each of the bosses 5a having a substantially square section is pressed by each of the pressure members 11, respectively, at the predetermined angle to the side surface. Therefore, in view of the formulas (1) to (3), the amount of deflection of each of the pressure members 11 can be reduced to a level smaller than that of the prior art apparatus shown in FIG. 2.

Figure 8:
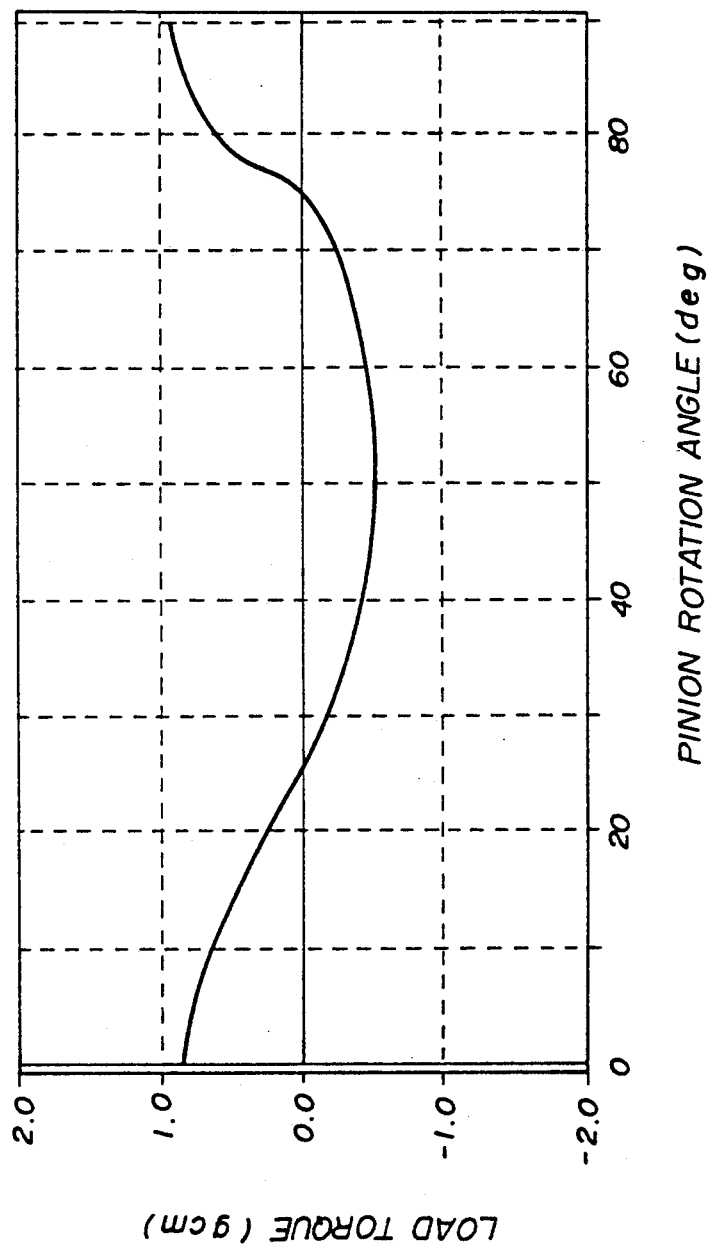
FIG. 8 is a characteristic chart for explaining the load torque characteristic of the odometer apparatus shown in FIG. 4 when the pinions rotate around the supporting shaft.

FIG. 8 shows a load torque characteristic of the odometer apparatus with the pressure members 11 arranged as described above when the pinions 5 rotate around the supporting shaft 3. As shown in the characteristic chart in FIG. 8, the peak load torque applied to the odometer apparatus is the initial load torque when the rotation angle of the pinions 5 is equal to zero. In the case of the prior art apparatus shown in FIG. 2, the level of the peak load torque applied thereto is twice that of the initial load torque. It is apparent that the peak load torque of the present invention can be reduced to the least possible level necessary for eliminating an error in the indication figure due to the backlash between the gears and the pinions. Therefore, it is possible to operate the odometer apparatus of the present invention by supplying the above mentioned least possible level of the drive torque to the worm gear shaft 8.

As described above, the maximum load torque for eliminating an error in the indication figure due to the backlash between the gears and the pinions can be reduced suitably to the least possible level. The reduction of the peak load torque in the odometer apparatus allows a smaller drive motor and a smaller space to install such a drive motor in the odometer apparatus to be used, thus making a compact odometer design and a reduction of the manufacturing cost of the odometer apparatus possible. In addition, it should be noted that the load torque described above can be reduced when the angle of each of the pressure members 11 relative to the side surface of the square section of each of the bosses 5a is set to be equal to an angle between 10 deg and 20 deg.

Figure 9:
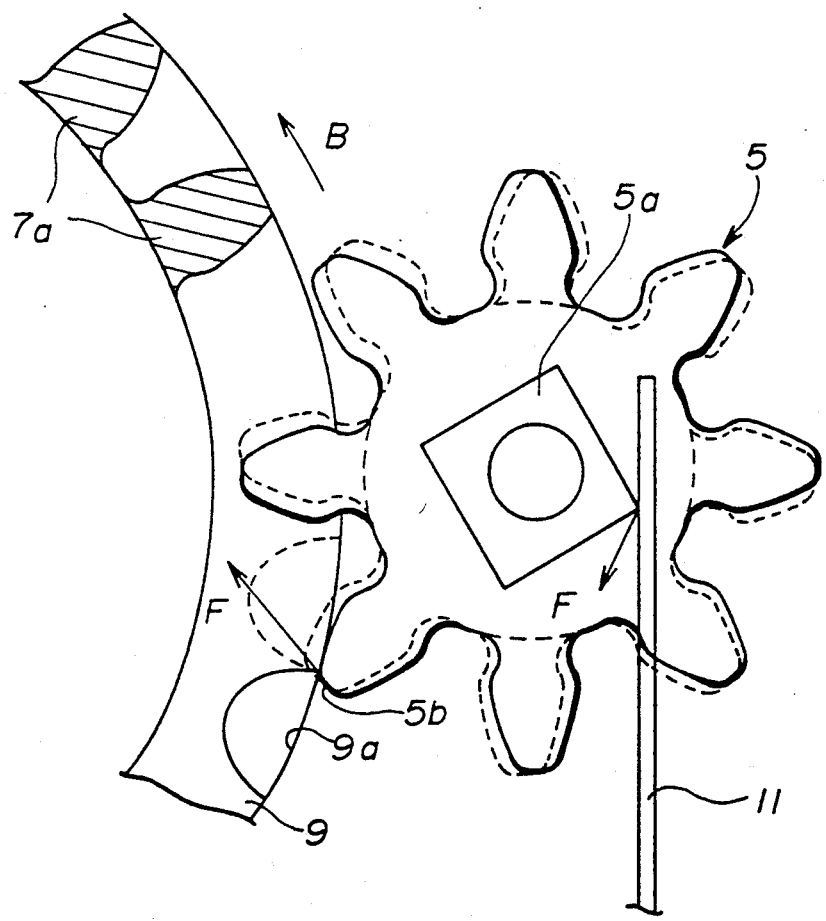
FIG. 9 is an enlarged side view showing another essential part of the odometer apparatus according to the present invention, which corresponds to a side view taken along line IX—IX in FIG. 1.

The odometer apparatus of the present invention also has a reverse rotation prevention mechanism which has a simple shape. FIG. 9 shows another essential part of the odometer apparatus according to the present invention. It should be noted that FIG. 9 is a side view of the odometer apparatus of the present invention, which corresponds to a side view taken along the line IX—IX in FIG. 1. Similar to the apparatus shown in FIG. 4, this odometer apparatus shown in FIG. 9 has a plurality of pinions 5 are rotatably supported on the first shaft for transmitting rotation to a plurality of gears 41 to 46 being rotatably supported on the second shaft. A plurality of bosses 5a are each arranged along the supporting shaft between two adjacent pinions among the pinions 5 and formed integrally with each of the pinions 5, each of the bosses 5a having a substantially square section taken in a plane perpendicular to the supporting shaft and being defined by four sides and four edges. And, a plurality of pressure members 11 are provided such that the pinions 5 and the bosses 5a are arranged on the supporting shaft, as shown in FIG. 4, to make a set of teeth of each of the pinions 5 be at a phase angle to the four sides and four edges of each of the bosses 5a, the phase angle being equal to a predetermined angle of each of the pressure members 11 relative to the side surface of each of the bosses 5a. This predetermined angle is equal to an angle of between 10 deg and 20 deg, as described above.

Figure 10:
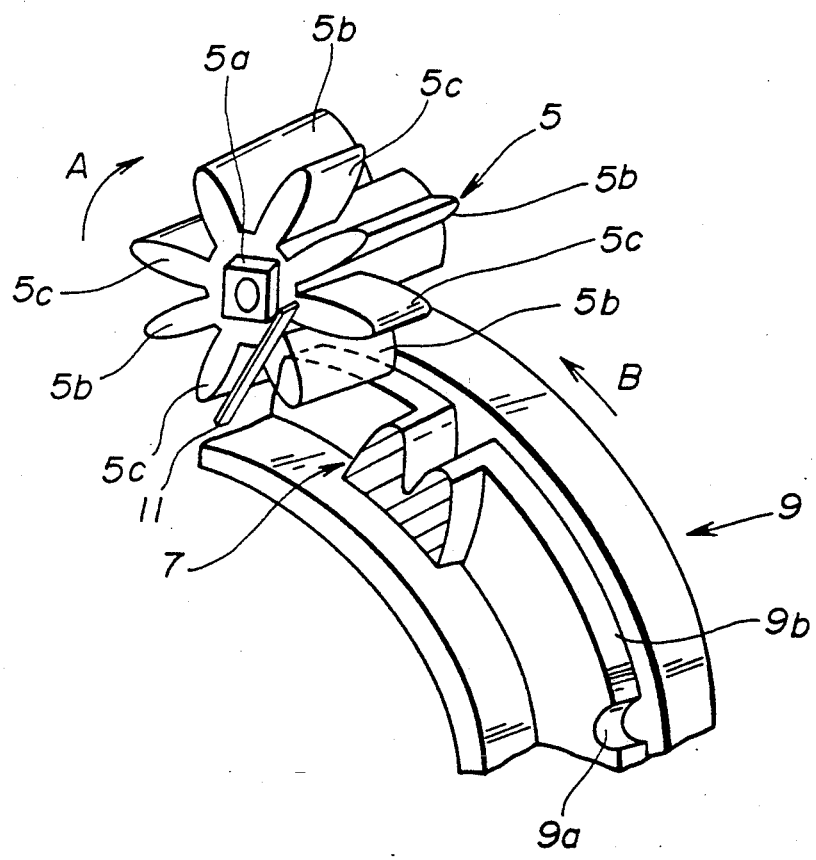
FIG. 10 is a perspective view showing the essential part of the odometer apparatus shown in FIG. 9.

As is apparent from FIG. 10, this odometer apparatus includes the pinion 5 having eight connecting teeth on a peripheral portion thereof, and these eight teeth are formed into wide teeth 5b and narrow teeth 5c which are alternately arranged on the peripheral portion of the pinion 5. The transmitting gear 9 is rotatably supported on the shaft and formed with the two shift teeth 7 and a stepped surface 9b on the periphery of the transmitting gear 9. On the stepped surface 9b, the recessed portion 9a is formed such that one of the teeth 5b of the pinion 5 is connected with the recessed portion 9a when the gears are rotated in the reverse direction. The teeth 5b of the pinion 5 are placed in contact with the stepped surface 9b of the transmitting gear 9. The pinion 5 does not rotate when the narrow teeth 5c are connected with the connecting teeth of the gears while the same is rotated by ¼ revolution for each revolution of the transmitting gear 9 by the engaging of one wide tooth 5b with the two shift teeth 7 of the gear 9. In such a manner, a rotating force is intermittently transmitted between the pinion 5 and the gear 9. The teeth 5b, 5c of each of the pinions 5 are engaged with the connecting teeth 6 of each of the gears 41 to 46, and the two shift teeth 7 of the transmitting gear 9 connected with the teeth 5b of the right-most pinion 5 transmit the rotation movement to the right-most gear 41.

In the odometer apparatus shown in FIGS. 9 and 10, the transmitting gear 9 has the recessed portion 9a on the outside peripheral surface and the pressure member 11, formed as the spring member of the present invention, is arranged such that a side surface of one of the bosses 5a is pressed by the pressure member 11 against the supporting shaft at a predetermined angle to the side surface of the boss 5a. The boss 5a is pressed by the pressure member 11 to rotate the boss 5a in the reverse direction (as indicated by an arrow "A" in FIG. 10) around the supporting shaft. As described above, the predetermined angle is equal to an angle of between 10 deg and 20 deg. When the gears 41 to 46 are rotated in the reverse direction (as indicated by an arrow "B" in FIG. 10) and the transmitting gear 9 is moved to a position indicated by a dotted line in FIG. 9, one of the teeth 5b of the pinion 5 is rotated to a position indicated by a dotted line in FIG. 9, and the tooth 5b of the pinion 5 strikes and connects with the recessed portion 9a on the outside peripheral surface of the transmitting gear 9, thus stopping the reverse rotation of the gears around the supporting shaft. It should be noted that the forward rotation of the pinions 5 around the supporting shaft allows the gears 41 to 46 to be rotated in a normal condition.

In addition, if the angle of the pressure member 11 relative to the side surface of the boss 5a is changed so as to arrange the pressure member 11 as the spring member in parallel to and snugly with the side surface of the boss 5a, it is possible to make the pinions 5 rotate both in the forward and reverse directions around the shaft and the pinions do not come in contact with the recessed portion 9a on the outside peripheral surface of the transmitting gear 9.

As described above, the reverse rotation prevention mechanism of the odometer apparatus can have gears with a simple shape having the recessed portion 9a formed thereon, and the pressure member 11 is provided as the spring member to eliminate the indication figure error, which is arranged so as to press a side surface of the boss 5a. Thus, the reverse rotation prevention mechanism can be made with less expensive parts. If the angle of the pressure member 11 relative to the side surface of the boss 5a is changed such that the pressure member 11 is arranged in parallel to and snugly in contact with the side surface of the boss 5a, it is possible to release the reverse rotation prevention mechanism so that the gears 41 to 46 and the pinions 5 are rotatable in the forward and reverse directions around the supporting shaft. In this odometer apparatus, the recessed portion 9a is formed on a surface of the transmitting gear 9 which is located at the right-most position on the supporting shaft 2. However, the present invention is not limited to the above described embodiment, and modifications and variations may be made without departing from the scope of the present invention, and it should thus be noted that the recessed portion 9a may be formed on the outside peripheral surface of any one of the indication gears 41 to 46.

What is claimed is:

1. An odometer apparatus comprising:
   a plurality of gears rotatably supported on a first shaft for indicating an indication figure with a set of digits when each of said gears is in a predetermined rotary position, an amount of rotation by each of the plurality of gears indicating each digit of the set of digits of the indication figure;
   a plurality of pinions coupled with the plurality of gears and rotatably supported on a second shaft parallel to said first shaft, for transmitting rotation to the plurality of gears, said pinions having initial positions corresponding to said predetermined rotary positions of said gears;
   a plurality of bosses each arranged between two adjacent pinions among said pinions and rotatable therewith, each of said bosses having a substantially square section taken in a plane perpendicular to the second shaft, and each of said bosses being defined by four side surfaces and four edges; and
   means for eliminating an error in the indication figure due to a backlash between said gears and said pinions, said means comprising a deflectable pressure member engaged with one of said bosses for pressing said side surfaces and edges, said pressure member arranged such that said one of the bosses is pressed by said pressure member at a predetermined angle of between 10 degrees and 20 degrees to a side surface of said one of the bosses when a pinion associated with said boss is in said initial position to apply appropriate pressure to said one of the bosses on the second shaft to eliminate said error in the indication figure,
   whereby the amount of deflection of said pressure member is reduced in comparison with an amount of deflection of a pressure member arranged in parallel to a side surface of a boss when said pinion is in said initial position, and that said apparatus with the thus arranged pressure member is subjected to a maximum load torque when the pinions are in said initial positions.

2. The apparatus as claimed in claim 1, wherein said pressure member comprises a leaf spring, said leaf spring being fixed at one end thereof to a frame of the odometer apparatus, the other end thereof pressing on said boss.

3. The apparatus as claimed in claim 1, wherein said pinions and said bosses are formed to have a phase angle between a set of teeth of each of the pinions and the four side surfaces and four edges of each of the bosses around the second shaft, said phase angle being equal to said predetermined angle of said pressure member relative to the side surface of said boss.

4. The apparatus as claimed in claim 1, wherein said pressure member is slantingly fixed at one end thereof to a frame of the odometer apparatus such that said boss is pressed by said pressure member at said predetermined angle.

5. The apparatus as claimed in claim 1, wherein said pressure member is bent at an intermediate portion thereof such that said boss is pressed by said pressure member at said predetermined angle.

6. An odometer apparatus which comprises:
   a plurality of gears for indicating an indication figure with a set of digits, the plurality of gears being supported on a first shaft for rotation in a first direction, and an amount of rotation by each of the gears indicating each digit of the set of digits in the indication figure;
   a plurality of pinions for transmitting a rotation force from a drive shaft to the plurality of gears, the plurality of pinions each being supported on a second shaft parallel to the first shaft and having a normal rotation direction there around, each of said pinions having a set of teeth cooperatively coupled with a gear of the plurality of gears; and
   spring means for exerting pressure on at least one of the pinions to urge rotation of said pinion in a direction opposite to the normal rotation direction of the pinions around the second shaft,
   at least one of the gears having a recessed portion formed on an outside peripheral surface thereof, said one of the gears having a set of teeth cooperatively coupled with the set of teeth of said pinion on which the pressure is exerted by said spring means, one of the teeth of said pinion striking and connecting with said recessed portion when the gears are rotated in a second direction of rotation around the first shaft opposite said first direction, thus preventing the gears from being rotated in the second direction.

7. The apparatus as claimed in claim 6, further comprising a plurality of bosses each arranged between two adjacent pinions among the pinions and formed integrally with each of the pinions, each of the plurality of bosses having a substantially square section taken in a plane perpendicular to the second shaft, and each of the bosses being defined by four sides and four edges, said spring means engaging one of said bosses for exerting pressure on said at least one of said pinions.

8. The apparatus as claimed in claim 7, wherein said gears provide an indication figure when in a predetermined rotary position, wherein said pinions have an initial position corresponding to said predetermined rotary position and wherein said spring means is formed as a pressure member engaged with one of the bosses, said pressure member arranged such that said boss is pressed by said pressure member at a predetermined angle relative to a side surface of said one of said bosses to apply appropriate pressure to said boss on the second shaft to eliminate an error in the indication figure.

* * * * *